(12) United States Patent
Fourie

(10) Patent No.: US 10,790,883 B2
(45) Date of Patent: Sep. 29, 2020

(54) MIMO SYSTEM AND METHOD UTILIZING INTERFEROMETRIC PATTERN

(71) Applicant: POYNTING ANTENNAS (PTY) LIMITED, Johannesburg (ZA)

(72) Inventor: Andries Petrus Cronje Fourie, Johannesburg (ZA)

(73) Assignee: POYNTING ANTENNAS (PTY) LIMITED, Johannesburg (ZA)

( * ) Notice: Subject to any disclaimer, the term of this patent is extended or adjusted under 35 U.S.C. 154(b) by 0 days.

(21) Appl. No.: 16/466,728

(22) PCT Filed: Dec. 5, 2017

(86) PCT No.: PCT/IB2017/057643
§ 371 (c)(1),
(2) Date: Jun. 5, 2019

(87) PCT Pub. No.: WO2018/104854
PCT Pub. Date: Jun. 14, 2018

(65) Prior Publication Data
US 2019/0296803 A1    Sep. 26, 2019

(30) Foreign Application Priority Data

Dec. 5, 2016  (ZA) .................................. 2016/08356

(51) Int. Cl.
*H04B 7/04* (2017.01)
*H04B 7/0426* (2017.01)
(Continued)

(52) U.S. Cl.
CPC ........... *H04B 7/043* (2013.01); *H04B 7/0413* (2013.01); *H04B 7/0617* (2013.01); *H04B 17/336* (2015.01); *H04B 17/382* (2015.01)

(58) Field of Classification Search
CPC .... H04B 7/043; H04B 17/336; H04B 17/382; H04B 7/0413; H04B 7/0617
See application file for complete search history.

(56) References Cited

U.S. PATENT DOCUMENTS

| | | | |
|---|---|---|---|
| 6,008,760 A * | 12/1999 | Shattil ...................... | H01Q 3/26 250/551 |
| 2009/0231957 A1* | 9/2009 | Jean ........................ | G01S 15/89 367/103 |

(Continued)

FOREIGN PATENT DOCUMENTS

WO    2015/162569 A1    10/2015

OTHER PUBLICATIONS

International Search Report and Written Opinion for PCT/IB2017/057643, dated Mar. 28, 2018.

*Primary Examiner* — Freshteh N Aghdam
(74) *Attorney, Agent, or Firm* — Merchant & Gould P.C.

(57) ABSTRACT

A communications system 10 comprises a source arrangement 12 of periodic waves. The source arrangement is configured to generate an interferometric wave pattern having a plurality of lobes 18.1 to 18.13. Each lobe has a main axis 20 diverging from an origin 22 at the source arrangement and a null 24 between any two adjacent lobes. At least one sensor arrangement 26 is provided for the waves. The sensor arrangement comprises a first sensor 28 and a second sensor 30 which are spaced from one another. A first signal source 40 is connected to the source arrangement 12 via a phase shift arrangement 41 to generate a first interferometric wave pattern 18 which illuminates the first sensor 28 more than the second sensor 30. A second signal source 42 is connected to the source arrangement via the phase shift arrangement to generate a second interferometric pattern 46 which is off-set from the first interferometric pattern and (Continued)

which illuminates the second sensor more than the first sensor.

15 Claims, 4 Drawing Sheets

(51) Int. Cl.
    *H04B 17/336*      (2015.01)
    *H04B 17/382*      (2015.01)
    *H04B 7/06*      (2006.01)
    *H04B 7/0413*      (2017.01)

(56) References Cited

U.S. PATENT DOCUMENTS

| | | | |
|---|---|---|---|
| 2011/0304507 A1* | 12/2011 | Mujahed | G01C 21/005 |
| | | | 342/417 |
| 2016/0118716 A1* | 4/2016 | Stephenne | H01Q 3/34 |
| | | | 342/372 |
| 2016/0172754 A1* | 6/2016 | Zhai | H01Q 3/30 |
| | | | 342/371 |
| 2019/0356365 A1* | 11/2019 | Strong | H04B 7/0456 |

* cited by examiner

ND METHOD UTILIZING
INTERFEROMETRIC PATTERN

MIMO SYSTEM AND METHOD UTILIZING INTERFEROMETRIC PATTERN

This application is a National Stage Application of PCT/IB2017/057643, filed Dec. 5, 2017, which claims benefit of Patent Application No. 2016/08356, filed Dec. 5, 2016 in South Africa, and which applications are incorporated herein by reference. To the extent appropriate, a claim of priority is made to each of the above-disclosed applications.

INTRODUCTION AND BACKGROUND

This invention relates to a communication system and method and more particularly to a multiple-input and multiple-output (MIMO) system without relying on multi-path propagation.

MIMO systems rely on a plurality of de-correlated paths between transmit and receive antennas to transmit several data streams on the same frequency, thereby increasing channel capacity. Typically, in free space point to point radio communication systems only two fully de-correlated channels are possible. These are either two orthogonal or opposite circularly polarized transmissions and can be generated and received with no or low correlation between such polarization schemes. This allows for 2×2 MIMO systems in free space, but higher order MIMO like 4×4 or 8×8 are generally believed impossible without reflections within the channel. Hence, higher than 2×2 MIMO is achieved in practice utilizing chance reflections between transmit and receive locations.

OBJECT OF THE INVENTION

Accordingly, it is an object of the present invention to provide a communication system and method between cooperating transmit and receive antennas which achieves de-correlated channels, without relying or utilizing reflections causing multipathing and with which the applicant believes the aforementioned disadvantages may at least be alleviated or which may provide a useful alternative for the known antennas and methods.

SUMMARY OF THE INVENTION

According to the invention there is provided a communications system comprising:
- a source arrangement of periodic waves, the source arrangement being configured to generate an interferometric wave pattern, the interferometric wave pattern comprising a plurality of lobes each having a main axis diverging from an origin at the source arrangement and a null between any two adjacent lobes;
- at least one sensor arrangement for the waves, the sensor arrangement comprising at least a first sensor and a second sensor which are spaced from one another;
- a first signal source connected to the source arrangement via a phase shift arrangement to generate a first interferometric wave pattern which illuminates the first sensor more than the second sensor; and
- a second signal source connected to the source arrangement via the phase shift arrangement to generate a second interferometric pattern which is off-set from the first interferometric pattern and which illuminates the second sensor more than the first sensor.

The periodic waves may have a centre frequency of $f_c$ which is associated with a wavelength $\lambda_c$, the source arrangement may comprise at least a first wave source and a second wave source which are spaced a distance $d_1$ from one another, there may be an angle $\theta$ between any main axis and an adjacent null, the at least one sensor arrangement may be spaced a distance s from the wave source arrangement, the first sensor and the second sensor may be spaced a distance $d_2$ from one another, so that $$d_1 = \lambda_c s / 2 d_2$$

and so that a line between the spaced sensors subtend the angle $\theta$ at the origin, the first signal source may be connected via the phase shift arrangement to the first and second wave sources, with a first phase difference between them, collectively to generate the first interferometric pattern; and the second signal source may be connected via the phase shift arrangement to the first wave source and to the second wave source, with a second phase difference between them, a difference between the first phase difference and the second phase difference being between 90 degrees and 270 degrees, collectively to generate the second interferometric pattern.

Each wave source may comprise a transmitting antenna and each sensor may comprise a receiving antenna.

It is a fundamental property of antennas that the receiving pattern (sensitivity as a function of direction) of an antenna when used for receiving is identical to the far-field radiation pattern of the antenna when used for transmitting. This is a consequence of the reciprocity theorem of electromagnetics. Therefore, when radiation patterns are referred to in this specification, the antenna can be viewed as either transmitting or receiving or both, whichever is more convenient in the context.

Said difference between the first phase difference and the second phase difference may be 180 degrees.

The waves referred to in this specification may be acoustic waves or electromagnetic waves, including radio frequency waves and optical waves. In a preferred embodiment of the invention the frequency $f_c$ of the radio frequency waves is larger than 5 GHz.

In some embodiments, typically point-to-multipoint systems more than at least one sensor arrangement may be provided and typically, k (k=2 ... n) sensor arrangements may be provided, each a respective distance $s_k$ from the source arrangement and in compliance with the requirement $$d_1 = \lambda_c s_k / 2 d_{2k}$$

wherein $s_k$ is the distance between the source arrangement and the $k^{th}$ sensor arrangement and $d_{2k}$ is the spacing between the at least two sensors of the $k^{th}$ sensor arrangement.

In other embodiments, the source arrangement may comprise at least first and second directional wave sources or antennae mounted in back to back configuration a distance smaller than $d_1$ apart and which in use launch waves in opposite directions; and deflectors for the waves which deflectors are spaced the distance $d_1$ apart, to reflect the waves towards the at least one sensor arrangement.

Similarly, at least one of said sensor arrangements may comprise sensors mounted in back to back configuration a distance smaller than d2 apart and associated deflectors for impinging waves which are spaced the distance d2 apart, to reflect the impinging waves towards the sensors.

The first and second wave sources of the source arrangement may be located on a first base line or axis and the source arrangement may further comprise at least third and fourth wave sources spaced on a second axis which is orthogonal to the first axis, to provide 4×4 MIMO decorrelation by having interferometric wave patterns in a first or horizontal orientation as well as interferometric wave patterns in a second or vertical orientation, which provides four (4) decorrelated wave paths.

Similarly, the first and second sensors of the at least one sensor arrangement may be located on an axis parallel to the first axis and the sensor arrangement may further comprise at least third and fourth sensors which are spaced on an axis orthogonal to said parallel axis.

The system may comprise more wave sources and sensors such that sufficient decorrelation is achieved to support higher order MIMO communication by virtue of the spacing between sensors, spacing between wave sources and link distance s between transmit source or transmit arrangements and sensor or receiver arrangements.

Hence, the invention further extends to a system as defined above comprising a plurality of source arrangements on the first axis each having a different spacing between its respective source elements.

According to another aspect of the invention there is provided a method of communication comprising:
  utilizing a communications system comprising: a source arrangement configured to generate an interferometric wave pattern, the interferometric wave pattern comprising a plurality of lobes each having a main axis diverging from an origin at the source arrangement, a null between any two adjacent; and at least one sensor arrangement for the waves, the sensor arrangement comprising at least a first sensor and a second sensor;
  driving the source arrangement with a first signal source to generate a first interferometric wave pattern which illuminates the first sensor more than the second sensor; and
  driving the source arrangement with a second signal source to generate a second interferometric pattern which is off-set from the first interferometric pattern and which illuminates the second sensor more than the first sensor.

The periodic waves may have a centre frequency $f_c$ which is associated with a wavelength $A_c$, the source arrangement may comprise at least a first wave source and a second wave source which are spaced a distance di from one another, there is an angle $\Theta$ between any main axis and an adjacent null, the sensors may be spaced a distance d2 from one another, so that $$d_1 = \lambda_c s/2d_2$$

and so that a line between the spaced sensors subtend the angle $\theta$ at the origin; the first signal source may be connected via a phase shift arrangement to the first and second wave sources, with a first phase difference between them, collectively to generate the first interferometric wave pattern; and the second signal source may be connected via the phase shift arrangement to the first wave source and to the second wave source, with a second phase difference between them, a difference between the first phase difference and the second phase difference being between 90 degrees and 270 degrees, collectively to generate the second interferometric pattern.

BRIEF DESCRIPTION OF THE ACCOMPANYING DIAGRAMS

The invention will now further be described, by way of example only, with reference to the accompanying diagrams wherein.

Figure 1:
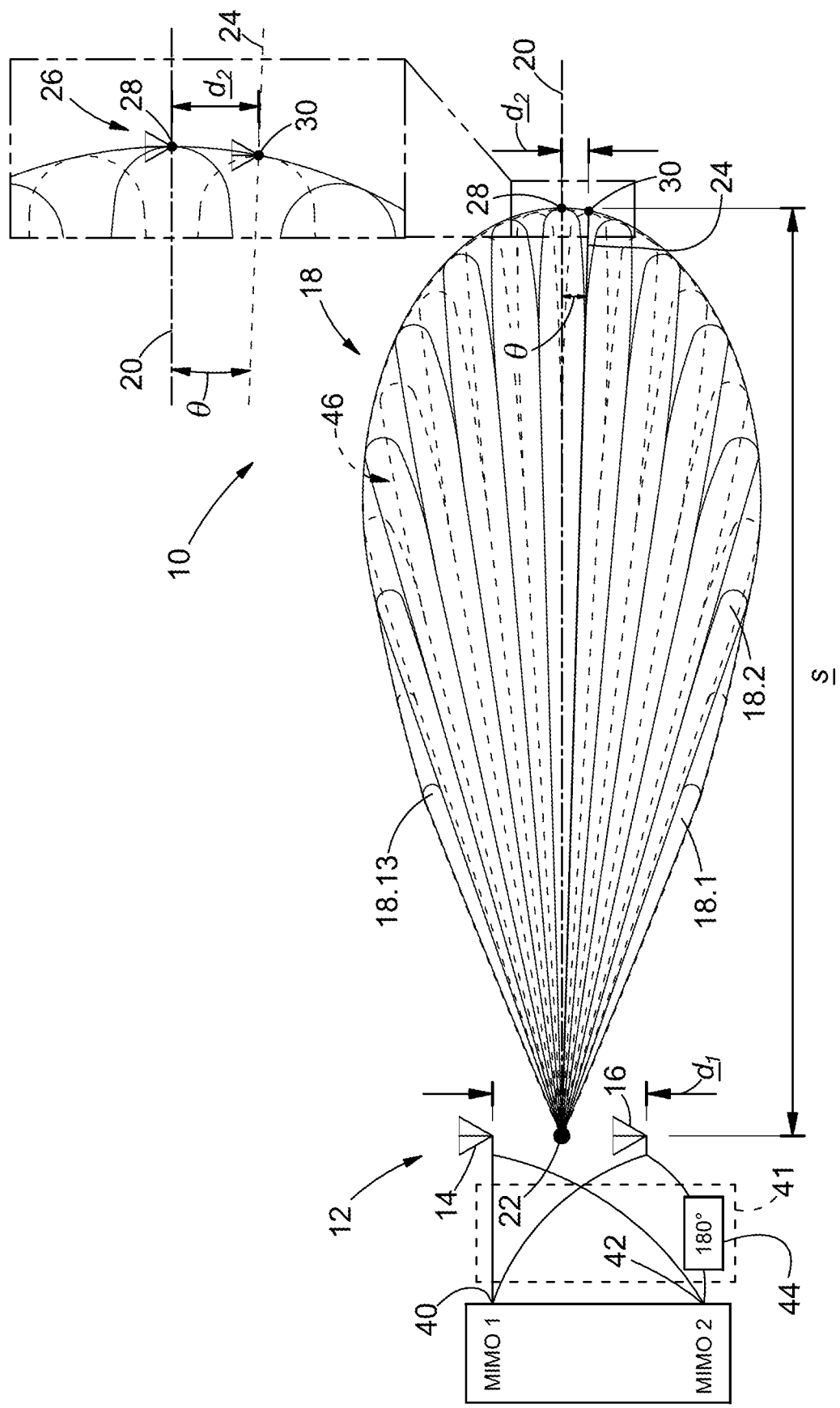
FIG. 1 is a diagrammatic representation of an example embodiment of a communication system comprising a source arrangement and a sensor arrangement.
Figure 3:
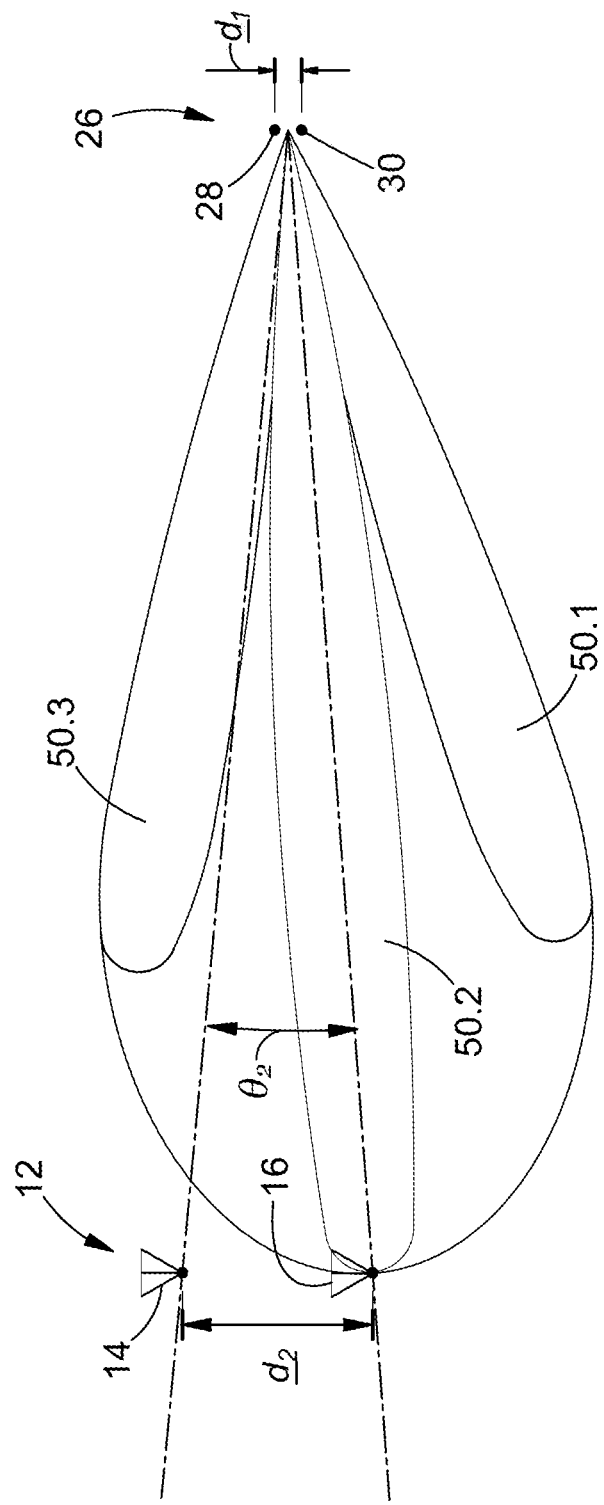
Figure 4:
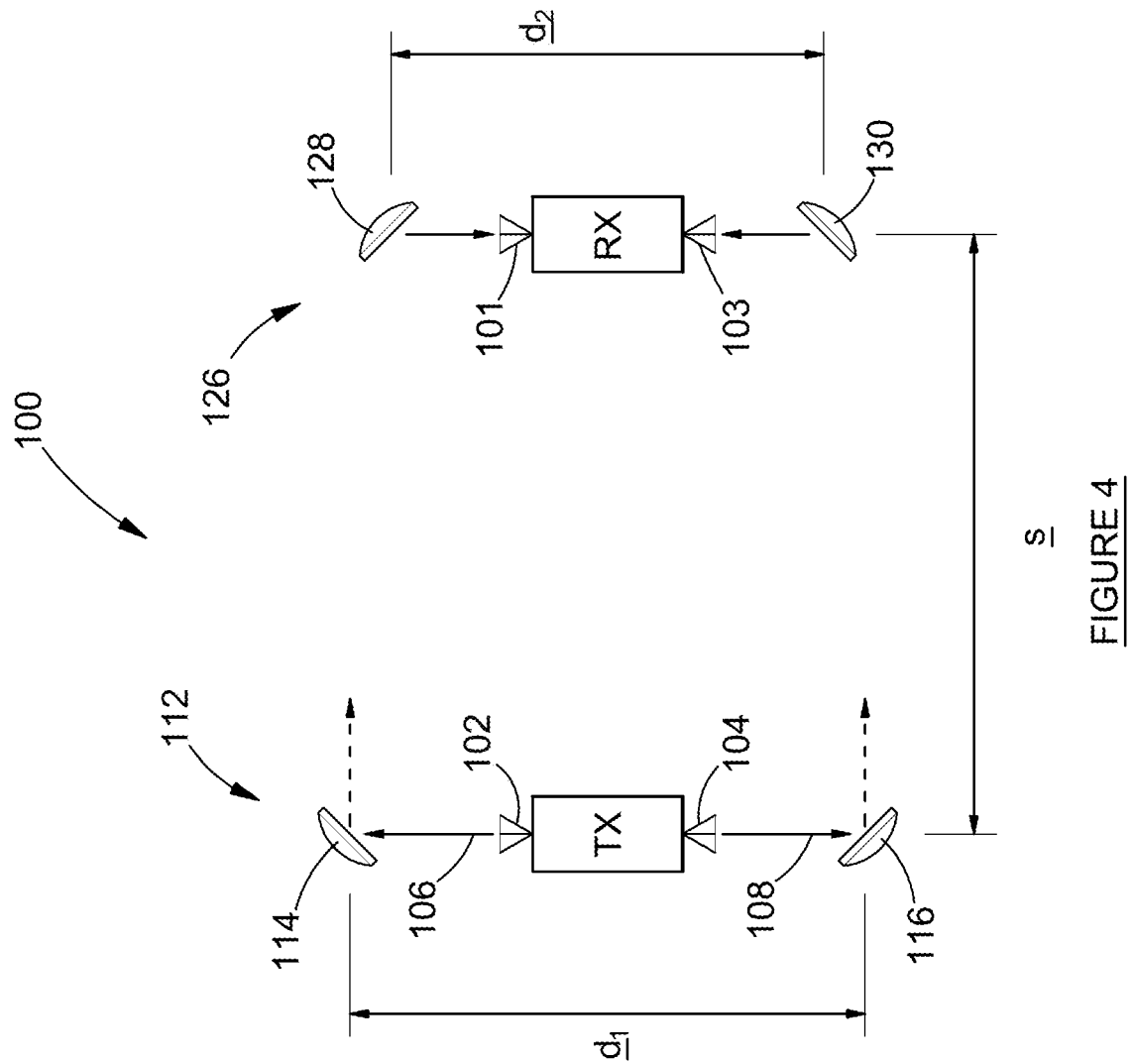

FIG. 3 is a diagrammatic representation of the configuration of FIG. 1 when used in reciprocal fashion, that is with the source arrangement acting as sensor arrangement and vice versa; and FIG. 4 is a diagrammatic representation of another example embodiment of a communication system utilizing closely spaced antennae and associated deflectors to achieve a required distance between spaced wave sources and a required distance between sensors.

DESCRIPTION OF A PREFERRED EMBODIMENT OF THE INVENTION

An example embodiment of a communication system is generally designated by the reference numeral 10 in FIG. 1.

The system comprises a source arrangement 12 of periodic waves having a centre frequency $f_c$, which is associated with a wavelength $\lambda_c$. The source arrangement comprises at least a first wave source 14 and a second wave source 16 which are spaced a distance $d_1$ from one another, to generate an interferometric wave pattern 18. The interferometric wave pattern 18 comprises a plurality of lobes 18.1 to 18.13. Each lobe has a respective main axis 20 and the main axes diverge from an origin 22 at the source arrangement. There is a null 24 between any two adjacent lobes and an angle $\theta$ between any main axis and an adjacent null. The system further comprises a sensor arrangement 26 for the waves which sensor arrangement 26 is spaced a distance s from the wave source arrangement 12. The sensor arrangement comprises at least a first sensor 28 and a second sensor 30 which are spaced a distance $d_2$ from one another so that $$d_1 = \lambda_c s/2d_2$$

and so that an imaginary line between the spaced sensors 28,30 subtends the angle $\theta$ at the origin 22. A first signal source 40 is connected via a phase shift arrangement 41 to the first and second wave sources 14, 16, with a first phase difference between them, collectively to generate a first interferometric wave pattern 18 (shown in solid lines in FIG. 1) which illuminates the first sensor 28 and not the second sensor 30. A second signal source 42 is connected via phase shift arrangement 41 to the first wave source 14 and to the second wave source 42 with a second phase difference between them, collectively and concurrently with the first interferometric pattern, to generate a second interferometric pattern 46 (shown in broken lines in FIG. 1) which is angularly off-set from the first interferometric pattern 18 and which illuminates the second sensor 30 and not the first sensor 28. A difference between the first phase difference and the second phase difference is between 90 degrees and 270 degrees.

The signal from the first signal source 40 is split into first and second paths. At least the first path may comprise a phase shift element (not shown) of the phase shift arrangement 41. However, in the example embodiment, the first path is connected to the first wave source 14 and the second path to the second wave source 16, so that the first phase difference is zero degrees. The first and second wave sources collectively transmit the signal to generate the first interferometric wave pattern 18, which ideally directs a lobe peak to the first sensor 28 and a null to the second sensor 30, but otherwise such that the first interferometric pattern 18 maximises the signal difference between the first sensor 28 and the second sensor 30, such that at the first sensor 28, the signal is at least 6 dB, preferably at least 10 dB, larger than at second sensor 30.

The signal from the second signal source 42 is also split into first and second paths. The first path is combined with the first path of the first transmit signal and connected to the first wave source 16. The second path comprises a 180 degrees phase shift element 44 of phase shift arrangement 41, so that the second phase difference is 180 degrees. Hence, in the example embodiment, the difference between the first phase difference and the second phase difference is 180 degrees. The first and second wave sources collectively transmit the signal from the second source 42 to generate the second interferometric wave pattern 46 which ideally directs a lobe peak to the second sensor 30 and a null to the first sensor 28, but otherwise such that the interferometric pattern 46 maximises the signal difference between the second sensor 30 and the first sensor 28, such that at the second sensor 30, the signal is at least 6 dB, preferably at least 10 dB, larger than at the first sensor 28.

Hence, MIMO signal 1 at output 40 and MIMO signal 2 at output 42 are transmitted simultaneously via the system 10 and MIMO signal 1 is received at antenna 28 and not at antenna 30 whereas MIMO signal 2 is received at antenna 30 and not at antenna 28. Hence, at the sensor arrangement 26 the MIMO signals are de-correlated and recoverable separately by electronic circuitry (not shown) which is connected to the antennas 28,30 at the sensor arrangement 26.

As shown in FIG. 1, in one preferred embodiment, the first signal source 40 and the second signal source 42 are the two outputs of a two by two (2×2) multiple input multiple output (MIMO) transmitter and the two sensors 28, 30 may be connected to the inputs of a 2×2 MIMO receiver (not shown). The MIMO transmit and receive system is already equipped with integral signal splitting as well as phase shifting and path combination mechanisms with an associated MIMO algorithm, to adjust phasing between the transmit signal sources 40,42 and the wave sources 14, 16, to maximise the difference between the signal at the second sensor 30 versus the signal at the first sensor 28 for one signal source and vice versa for the second signal source. By utilizing the above wave source and sensor configuration dimensions the MIMO algorithm is able to configure phase shift arrangement 41 and the phase relationship as stated above, to achieve suitable decorrelation between the two signal sources, which is required for effective MIMO operation.

Figure 2:
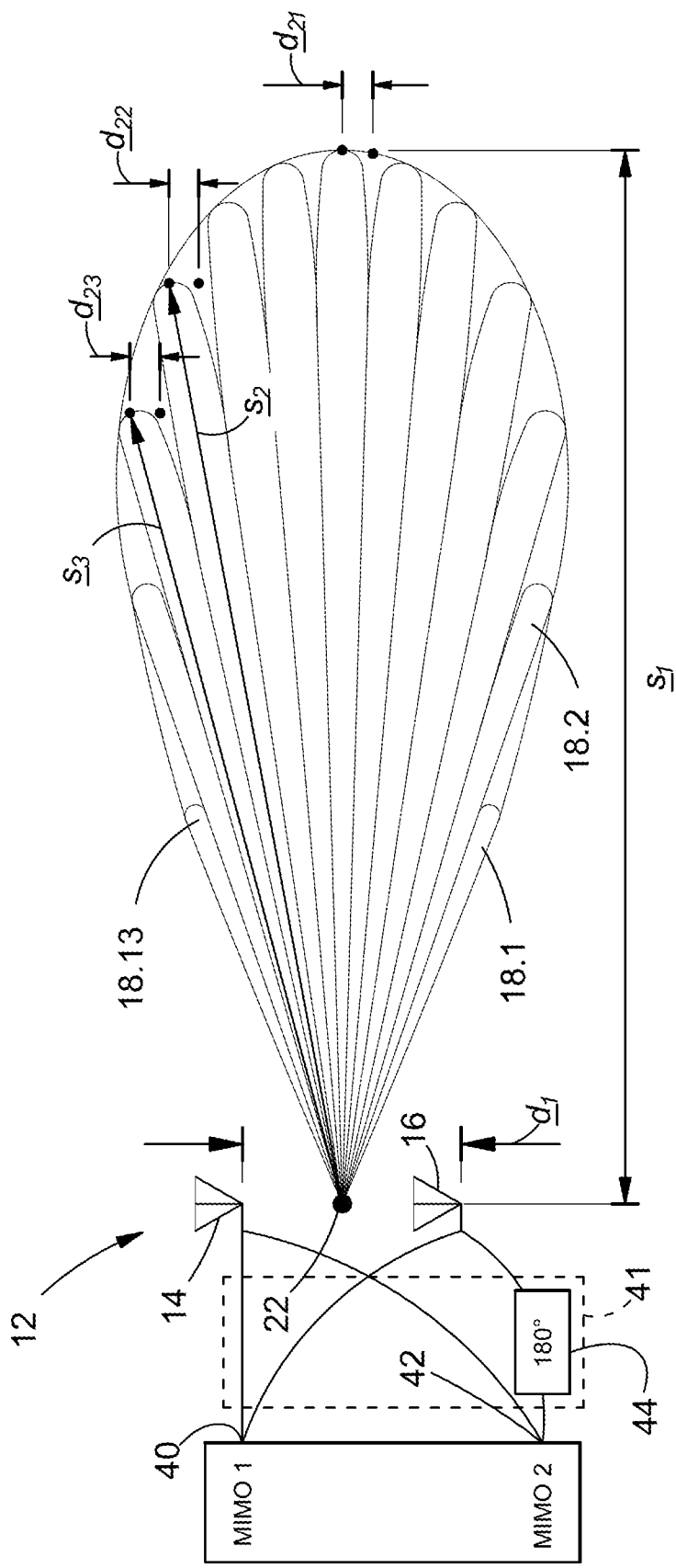
FIG. 2 is a diagrammatic representation of another example embodiment comprising a plurality of differently spaced sensor arrangements.

In FIG. 2 is shown a similar system, but with k sensor arrangements each spaced a distance $s_k$ (k=1, 2 and 3) from the source arrangement 12 and in compliance with the requirement $$d_1 = \lambda_c s_k / 2 d_{2k}$$

wherein $s_k$ is the distance between the source arrangement and the $k^{th}$ sensor arrangement and $d_{2k}$ is the spacing between the at least two sensors of the $k^{th}$ sensor arrangement. Hence, $d_{22}$ is the distance between the two sensors of the $2^{nd}$ sensor arrangement which is spaced $s_2$ from the source arrangement 12 and $d_{23}$ is the distance between the two sensors at the $3^{rd}$ sensor arrangement which is spaced $s_3$ from the source arrangement 12. Also at the $2^{nd}$ and $3^{rd}$ sensor arrangements the MIMO signals are de-correlated and recoverable separately by electronic circuitry (not shown) which is connected to the antennas at these sensor arrangements.

In FIG. 3, a reciprocal configuration is illustrated. In this configuration, the spaced antennas 28 and 30 which are spaced a closer distance $d_1$ than the antennas 14 and 16 which are spaced a distance $d_2$, are used as transmitting antennas and the antennas 14 and 16 are used as receiving antennas. It is well known that with closer spaced antennas, the lobes 50.1 to 50.3 of the interferometric pattern are broader and the diverging main axes are spaced at a bigger angle. Hence, the angle 82 between a main axis and an adjacent null is also larger than in the configuration of FIG. 1. As shown in FIG. 3, MIMO signals transmitted from arrangement 26 are also de-correlated at arrangement 12, so that they may be recovered separately by electronic circuitry (not shown) which is connected to the antennas at arrangement 12.

In FIG. 4, yet another example embodiment of the system is shown and designated 100. The system 100 comprises a source arrangement 112 comprising at least a first directional wave source such as a directional antenna 102, for example, and a second directional wave source or antenna 104 mounted in back to back configuration a distance smaller than $d_1$ apart and which in use launch waves in opposite directions as shown at 106 and 108. Deflectors 114 and 116 for the waves are provided and spaced the distance $d_1$ apart, to reflect the waves towards the at least one sensor arrangement 126. Similarly, the at least one sensor arrangement 126 may comprise sensors 101 and 103 mounted in back to back configuration a distance apart smaller than $d_2$. Respective associated deflectors 128 and 130, which are spaced the distance $d_2$ apart, are provided to reflect impinging waves from the source arrangement 112 towards the antennae 101 and 103 respectively.

It will be appreciated that there are many variations in detail on the system and method as herein defined and/or described without departing from the scope and spirit of the invention.

For example, phasing of a third MIMO signal at the source arrangement may be applied such that interferometer beams are in addition generated between the two sensor elements and autocorrelation between the two sensor elements may be used to increase the decorrelation between such a central beam (which will be approximately equally received by both sensor elements) from the above streams purely pointing at one or the other sensor element, thus creating an additional MIMO stream. Such decorrelation may be achieved by using a third and central sensing element and removing the residual signal received by this sensor element intended for the other two sensor elements, hence negating this "interference" and increasing the decorrelation of this central beam.

Further, there may be provided a central node comprising a plurality of source arrangements on the first axis each having a different spacing between its respective source elements and an adaptive controller which energizes the central node allows such as to achieve multiple streams to remote outer nodes with sensor elements spaced at unknown distance $d_2$ and/or unknown link distances s to the outer nodes.

The invention claimed is:
1. A communications system comprising:
 a source arrangement of periodic waves, the source arrangement comprising at least a first wave source and a second wave source which are spaced from one another to generate interferometric wave patterns utilizing the periodic waves, each of the interferometric wave patterns comprising a plurality of lobes each having a main axis diverging from an origin at the source arrangement and a null between any two adjacent lobes;

at least one sensor arrangement for the periodic waves, the sensor arrangement comprising at least a first sensor and a second sensor which are spaced from one another;

a first signal source connected via a phase shift arrangement to the first and second wave sources collectively to generate a first of the interferometric wave patterns which illuminates the first sensor more than the second sensor; and a second signal source connected via the phase shift arrangement to the first and second wave sources collectively to generate a second of the interferometric patterns which is off-set from the first interferometric pattern and which illuminates the second sensor more than the first sensor.

2. A communications system as claimed in claim 1 wherein the periodic waves have a centre frequency of $f_c$ which is associated with a wavelength $\lambda_c$, wherein the first wave source and the second wave source are spaced a distance $d_1$ from one another, wherein there is an angle $\theta$ between any main axis and an adjacent null, wherein the at least one sensor arrangement is spaced a distance s from the wave source arrangement, wherein the first sensor and the second sensor are spaced a distance $d_2$ from one another, so that $$d_1 = \lambda_c s/2d_2$$

and so that a line between the spaced sensors subtend the angle $\theta$ at the origin, wherein the first signal source is connected via the phase shift arrangement to the first and second wave sources, with a first phase difference between them, wherein the second signal source is connected via the phase shift arrangement to the first wave source and to the second wave source, with a second phase difference between them, and wherein a difference between the first phase difference and the second phase difference is between 90 degrees and 270 degrees.

3. A communications system as claimed in claim 2 wherein each wave source comprises a transmitting antenna and each sensor comprises a receiving antenna.

4. A communications system as claimed in claim 2 wherein the difference between the first phase difference and the second phase difference is 180 degrees.

5. A communications system as claimed in claim 1 wherein the periodic waves are one of acoustic waves and electromagnetic waves.

6. A communications system as claimed in claim 5 wherein the periodic waves are radio frequency waves and wherein the frequency $f_c$ is larger than 5 GHz.

7. A communications system as claimed in claim 2 comprising k (k≥2) sensor arrangements, each a respective distance $s_k$ from the source arrangement and in compliance with a requirement $$d_1 = \lambda_c s_k/2d_{2k}$$

wherein $s_k$ is a distance between the source arrangement and the $k^{th}$ sensor arrangement and $d_{2k}$ is a spacing between the at least two sensors of the $k^{th}$ sensor arrangement.

8. A communications system as claimed in claim 2 wherein the source arrangement comprises at least a first directional wave source and an associated first deflector and a second directional wave source and an associated second deflector, wherein the first and second directional wave sources are mounted in back to back configuration a distance smaller than $d_1$ apart, in use, to launch waves in opposite directions; and wherein the associated first and second deflectors are spaced the distance $d_1$ apart, to deflect the launched waves towards the at least one sensor arrangement.

9. A communications system as claimed in claim 2 wherein at least one of said sensor arrangements comprises a first sensor and an associated first deflector and a second sensor and an associated second deflector, wherein the first and second sensors are mounted in back to back configuration a distance smaller than d2 apart and wherein the associated first and second deflectors are spaced the distance d2 apart, to deflect impinging waves originating from the source arrangement towards the first and second sensors respectively.

10. A communications system as claimed in claim 2 wherein the first and second wave sources of the source arrangement are located on a first axis and wherein the source arrangement further comprises at least third and fourth wave sources which are spaced on a second axis which is orthogonal to the first axis.

11. A communications system as claimed in claim 10 wherein the first and second sensors of the at least one sensor arrangement are located on an axis parallel to the first axis and wherein the sensor arrangement comprises at least third and fourth sensors which are spaced on an axis orthogonal to said parallel axis.

12. A communications system as claimed in claim 2 comprising a plurality of source arrangements on a first axis each source arrangement having a different spacing between its respective sources.

13. A method of communication comprising:
utilizing a communications system comprising: a source arrangement of periodic waves configured to generate interferometric wave patterns utilizing the periodic waves, each of the interferometric wave patterns comprising a plurality of lobes each having a main axis diverging from an origin at the source arrangement and a null between any two adjacent lobes; and at least one sensor arrangement for the periodic waves, the sensor arrangement comprising at least a first sensor and a second sensor;

driving the source arrangement with a first signal source to generate a first of the interferometric wave patterns which illuminates the first sensor more than the second sensor; and driving the source arrangement with a second signal source to generate a second of the interferometric wave patterns which is off-set from the first interferometric wave pattern and which illuminates the second sensor more than the first sensor.

14. The method as claimed in claim 13 wherein the periodic waves have a centre frequency wavelength $f_c$ which is associated with a wavelength $\lambda_c$, wherein the source arrangement comprises at least a first wave source and a second wave source which are spaced a distance $d_1$ from one another, wherein there is an angle $\theta$ between any main axis and an adjacent null, wherein the at least one sensor arrangement is spaced a distance s from the source arrangement, wherein the sensors are spaced a distance $d_2$ from one another so that $$d_1 = \lambda_c s/2d_2$$

and so that a line between the spaced sensors subtend the angle $\theta$ at the origin; wherein the first signal source is connected via a phase shift arrangement to the first and second wave sources, with a first phase shift between them, collectively to generate the first of the interferometric wave patterns; and wherein the second signal source is connected via the phase shift arrangement to the first wave source and to the second wave source, with a second phase difference between them, wherein a difference between the first phase difference and the second phase difference is between 90 degrees and 270 degrees, collectively to generate the second of the interferometric patterns.

15. A multiple input multiple output (MIMO) communications system comprising:

a MIMO transmitter for transmitting periodic waves having a centre frequency of $f_c$, which is associated with a wavelength $\lambda_c$, the transmitter comprising at least a first port and a second port;

an antenna array comprising at least a first antenna and a second antenna, the first antenna being connected to the first port and the second antenna being connected to the second port;

the first antenna and the second antenna being spaced a distance d1 apart;

a MIMO receiver comprising at least a first receiver port and a second receiver port;

a sensor arrangement for sensing the periodic waves, the sensor arrangement comprising at least a first sensor and a second sensor, the first sensor being connected to the first receiver port and the second sensor being connected to the second receiver port;

the sensor arrangement being spaced a distance s from the antenna array;

the first sensor and the second sensor being spaced a distance d2 apart; and wherein the sensor arrangement being such that:

$$d2 = \frac{\lambda_c s}{2d1}.$$

* * * * *